United States Patent [19]

Shroff et al.

[11] Patent Number: 4,910,079

[45] Date of Patent: Mar. 20, 1990

[54] METHOD FOR THE FABRICATION OF AN IMPREGNATED CATHODE AND CATHODE OBTAINED THEREBY

[75] Inventors: Arvind Shroff, Paris; Serge Vilminot, Strasbourg; Dominique Brion, Thorigny; Bernard Carriere; Veronique Hebert, both of Strasbourg, all of France

[73] Assignee: Thomson-CSF, Paris, France

[21] Appl. No.: 287,328

[22] Filed: Dec. 21, 1988

[30] Foreign Application Priority Data

Dec. 23, 1987 [FR] France ................................ 87 18016

[51] Int. Cl.$^4$ ........................ H01J 9/04; C25B 11/10; B32B 15/00; B32B 18/00

[52] U.S. Cl. .................................... 428/306.6; 427/77; 427/126.4; 427/230; 428/307.3; 428/307.7; 428/539.5; 428/699; 445/51

[58] Field of Search ...................... 427/77, 126.4, 230; 428/306.6, 307.3, 307.7, 539.5, 699; 445/51

[56] References Cited

U.S. PATENT DOCUMENTS

| | | | |
|---|---|---|---|
| 3,458,913 | 8/1969 | Schmidt | 445/51 |
| 4,668,531 | 5/1987 | Asano et al. | 427/126.4 |
| 4,836,816 | 6/1989 | Bouchard et al. | 427/77 |

FOREIGN PATENT DOCUMENTS 2310941 9/1974 Fed. Rep. of Germany .

OTHER PUBLICATIONS

Powder Metallurgy International, vol. 18, No. 3, 1986, pp. 164–168; J. C. Bernier.

Revue Technique Thomson-CSF, vol. 14, No. 3, Sep. 1982, pp. 583–655; A. M. Shroff.

*Primary Examiner*—William J. Van Balen

*Attorney, Agent, or Firm*—Oblon, Spivak, McClelland, Maier & Neustadt

[57] ABSTRACT

Disclosed are a method for the fabrication of an impregnated cathode and a cathode obtained thereby. The impregnation is obtained by applying a sol-gel method. The emissive material which impregnates the body of the cathode only partially fills the pores. This facilitates the migration of the material towards the surface and increases the lifetime of the cathode.

9 Claims, 1 Drawing Sheet

METHOD FOR THE FABRICATION OF AN IMPREGNATED CATHODE AND CATHODE OBTAINED THEREBY

BACKGROUND OF THE INVENTION

1. Field of the Invention

An object of the present invention is a method for the fabrication of an impregnated cathode, and a cathode obtained by this method. It can be applied to the making of cathodes for electron tubes, microwave tubes, television camera tubes, display tubes etc.

2. Description of the Prior Art

An impregnated cathode consists of a porous body made of a refractory metal such as tungsten, impregnated with a mixture of alkaline earth metals or their oxides, capable of giving, on the surface of the cathode, free alkaline earth atoms.

The refractory metal body of the impregnated cathode may be made by compressing a finely divided powder of the metal by means of an isostatic press or a uniaxial press. The compact bodies obtained are then heated under hydrogen, at high temperature, in order to sinter the particles together and increase the density of the porous body.

To make it easier to machine the porous body, it is infiltrated with copper or plastic and then machined to the desired shape. Subsequently, the copper or plastic is removed by heating or by being dissolved in an acid.

In order to shorten the manufacturing process, the cathode can be also pressed into shape at the very first stage, taking into account size variation, that may occur during sintering.

The electron emissivity of these cathodes can be further increased if the porous bodies are made either with a mixture of tungsten with osmium or with other elements of platinum ore, or, again, with a mixture of tungsten and scandium oxide ($Sc_2O_3$) or oxides of other rare earths.

The porous body thus obtained is brazed on a molybdenum sleeve used to hold, on one side, the emissive pellet and, on the other side, the heater which is potted in alumina and enables the cathode to be heated.

The pores of the porous body can then be filled with barium and calcium aluminates. For this operation, the porous body is held in close contact with an aluminate composition which is brought under a reducing atmosphere, to a temperature which is greater than its melting point. The contact is provided either by submerging the porous body in aluminate or by placing the aluminate on the porous body. Upon melting, the aluminate diffuses by capillary action or flows into the open pores, and fills them completely. After cooling, the porous body is generally filled, to 90 or 100%, by the solidified aluminate. Afterwards the cathode is cleaned mechanically and chemically, in order to remove the aluminate residues which remain stuck to the surfaces.

The cathode is then mounted in a system under vacuum. It is then activated at a temperature at which the barium and calcium aluminates release barium oxide. Metallic barium is produced, in the zones where the aluminate is in contact with the refractory metal, by reduction of barium oxide vapor on the surface of the tungsten. The metallic barium reaches the end of the pores and diffuses throughout the emitting surface where it forms, with oxygen, a surface monolayer which favors electron emissivity by lowering the work function of the substrate.

Moreover, the deposition, on the emissive surface of these impregnated cathodes, of a thin film of a few thousand angstroms thick, of osmium, iridium, ruthenium or an alloy of these bodies with tungsten, may improve emissivity by a factor of about 3.

The lifetime of an impregnated cathode of this type depends on the supply of barium to the surface from within the pores, throughout the working life of the cathode. This process of supplying barium is, however, countered by the residues of reactions which form gradually and clog the pores, restricting the formation of free barium and its migration to the surface. At the end of the lifetime of these cathodes, it is observed that only a part of the barium reserve contained in the porous body has been used.

This drawback is related to standard impregnation procedures which result in compact filling, by the aluminates, of the open pores in their entirety, from the bottom of the porous body to its surface. Furthermore, the exact composition of the impregnating agent which occupies the pores is not known with precision, and depends very strongly on the conditions of impregnation.

The present invention is aimed precisely at overcoming these drawbacks. To this end, it proposes an original impregnation process. According to the invention, barium aluminate, calcium aluminate and, possibly, scandium aluminate are infiltrated in the sol state, namely in the state of stable colloidal suspension in an aqueous medium or in an organic solvent; and, after being applied by a sol-gel procedure, the compound then lines or loosely occupies the pores of the porous body throughout its thickness.

This distribution of the impregnating element increases the barium reserve which may effectively participate in the coating of the emissive surface. The cathodes obtained by the method of the invention thus have their lifetimes increased.

The compound which occupies the pores is of a known composition and is uniform at the atomic level. It can be mentioned that the application of the sol-gel procedure is already known in the fabrication of impregnated cathodes, but under totally different conditions of application. In fact, it has been proposed to prepare the barium aluminate and calcium aluminate powder by the sol-gel procedure instead of by the standard calcination of a mixture of carbonate and alumina. The sol-gel procedure has the advantage of giving very fine grain size and very homogeneous composition. The powder is brought to a temperature which is higher than its melting point. The impregnation of the porous body with tungsten then occurs according to the standard technique, described further above, by immersion in the melted mixture. The obtaining of the powders by the sol-gel method is described, for example, in the article by J. C. Bernier, "Sol-gel Processing for the Synthesis of Powders for Dielectrics" in "Powder Metallurgy International", Vol. 18, No. 3, 1986, pp. 164–168.

SUMMARY OF THE INVENTION

More precisely, an object of the invention, therefore, is a method for the fabrication of an impregnated cathode, wherein a porous body is made by pressing and sintering of at least one refractory metal powder, wherein this porous body is impregnated with a compound capable of resulting in high electron emissivity, a method wherein the operation to impregnate the body comprises the following steps:

a solution is made, consisting of a stable mixture of organometallic compounds, suited to the formation of a powder which leads to an electron emission and can be used in the application of a sol-gel procedure, the sol-gel procedure is triggered and controlled by appropriate means, the porous body is introduced into a solution where it is kept for an appropriate period, the organic solvents are removed, the temperature of the body is raised until the in situ calcining of the compound impregnating the body is obtained.

Another object of the invention is an impregnated cathode of the type obtained by applying the method just defined. This cathode is characterized by the fact that the pores of the sintered body are only partially filled by the emissive compound. This filling ranges between 10% and 50% (instead of 90% or more as in the prior art). Depending on the operating conditions (size of pores, temperature, gel viscosity, baking speed, etc.), the emissive compound may either line the walls of the pores, leaving a microchannel open for the migration of oxides towards the surface of the cathode, or result in a microporous volume that lets oxides pass through.

BRIEF DESCRIPTION OF THE DRAWINGS

In any case, the features and advantages of the invention will appear more clearly from the following description of examples, given by way of illustration, which in no way restrict the scope of the invention. This description is made with reference to the appended figures, of which.

DESCRIPTION OF A PREFERRED EMBODIMENT

Figure 1:
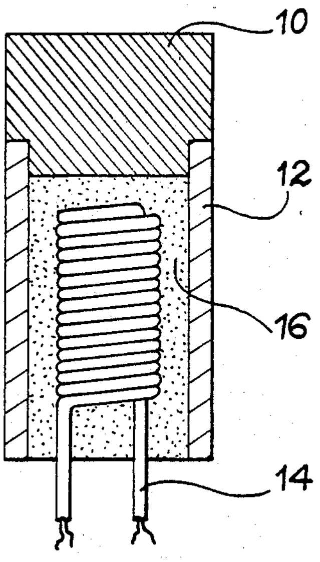
FIG. 1 shows a mounted, impregnated cathode.

FIG. 1 shows an impregnated pellet 10, mounted on a metallic sleeve made of molybdenum for example. A tungsten/rhenium heater 14, coated with an insulating film, is held in the sleeve 12 by an alumina potting 16.

This assembly is made as follows.

The body of the cathode is first prepared according to commonly used procedures. The method starts with one or more powders of materials which are processed by mixing, pressing, sintering, infiltration of copper or plastic material, machining and the release of the pores. Pellets pressed into shape can be also sintered directly. The porosity of the body thus obtained may be about 10% to 30%, as compared with the volume of the porous substrate.

At least one of the starting powders is a powder of known elements such as tungsten, molybdenum, tantalum, rhenium and the alloys that contain them, or a powder of an element capable of improving electron emission, such as osmium, rutheniun, iridium or alloys containing at least one of these elements or, again, a scandium oxide powder or particles of oxides containing scandium at a rate of 2% to 50% by volume of scandium in terms of scandium oxide.

By way of explanation, we may consider the following example.

A bar of tungsten, with 18% porosity, is obtained by isostatic pressing of a sieved tungsten powder with a grain size of around 7 μm, followed by sintering at 2100° C. under hydrogen. Pellets (as indicated at the reference 10 in FIG. 1) are machined from this porous tungsten bar, which had been previously infiltrated with a plastic material. After removal of the plastic material, the machined pellet is brazed on a sleeve (12 in FIG. 1) under hydrogen at 1950° C., using a Mo-Ru brazing alloy. A W-Re filament, coated with alumina beforehand, is potted with alumina inside the sleeve This operation is performed by the sintering at 1800° C., under hydrogen, of an alumina powder deposited by means of a slurry around the heater inside the sleeve.

As for the impregnation of this body, it can be performed according to the invention as follows.

The impregnating agent with electron emissivity is prepared with at least one organic precursor, either barium, calcium, aluminium, or, possibly, scandium. The other element or elements (Ba, Ca, Al, Sc) are introduced in the form of an organic or mineral salt soluble in the same solvent as the organic precursor or precursors, or in a solvent which is miscible with it.

The initial components are dissolved separately in organic solvents such as alcohols, acids or toluene, and then mixed together. Thus, a stable solution is obtained, containing two to four salts or organometallic compounds. In order to achieve the hydrolysis of this solution, a weak base ($NH_4OH$, $N_2H_4.H_2O$, $H_2O$ or other) is added. This weak base will also have a complexing role. After vigorous stirring, the gel slowly starts forming by hydrolysis and polycondensation without any precipitation being induced if the temperature is held between −10° and +10° C.

The porous bodies, brazed to the sleeve and provided with a filament held in the alumina, are then dipped in the solution with the emissive face downwards, in such a way that the alumina is kept away from contamination by the gel. The solution or the gel starts forming, and completely infiltrates the porous body.

The temperature of the solution is then gradually increased until it reaches a value ranging between about 40° C. and 70° C. and the formation of the gel continues for several hours.

After this operation, the recipient containing the cathode and the gel is very gradually raised to about 300° C., so that the organic solvents are completely removed and so that the gel is dried. The heating speed is slow in order to avoid any agglomeration in fine particles, and to ensure that the surface of the pores is evenly coated by the deposit.

The cathodes are then placed with care in a hydrogen furnace and heated, in a first step, to 700° C. for three hours so that the organic ligands undergo pyrolysis. At this stage of preparation, the barium aluminate and calcium aluminate line the surface of the pores to a great extent. This surface film is crystallized and stabilized by further heating under $H_2$ at 1000° C. But micropores may also occur in the volumes filling the pores.

Figure 2:
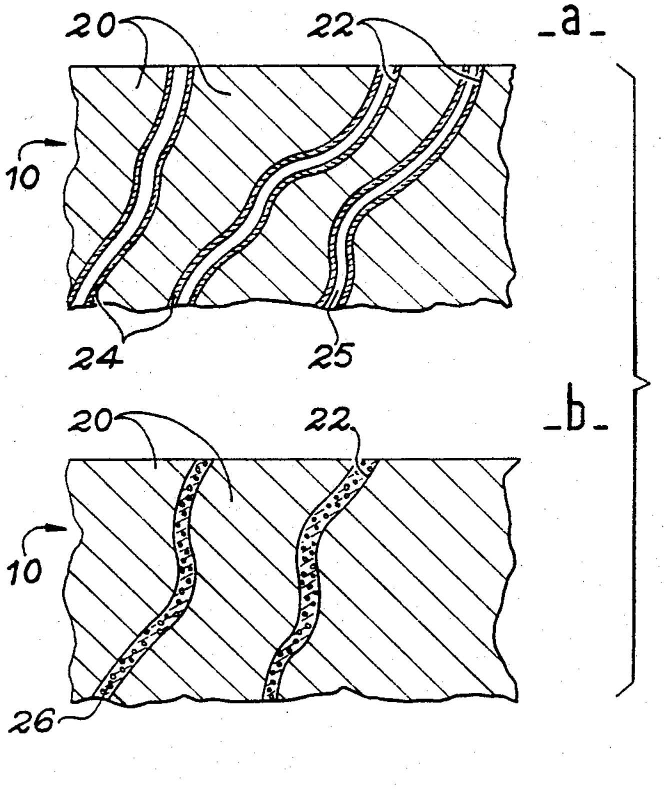
FIG. 2 (a and b) illustrates the loosely filled structure obtained according to the invention.

FIG. 2 gives a schematic view of two extreme cases: in the part a, a straight section is shown on the scale of a few grains of tungsten. These grains 20 define pores 22 which are lined with a layer 24 of barium aluminate and calcium aluminate. A microchannel 25 remains at the center of the pore. In the part b, the barium aluminate and calcium aluminate 36 is microporous.

In both cases, as in any intermediate case, the pores are only partly filled. As explained earlier, this gives the cathode a longer lifetime.

The conditions for putting products into solution and for the heat processing operations are adjusted in such a way that 10% to 50% of the volume of the pores is filled with barium aluminate and calcium aluminate. Furthermore, the sol-gel procedure gives absolute micro-homogeneity of the aluminate contained in the pores.

The electron emissive material, which incompletely fills the pores, includes aluminates of barium, calcium and scandium. For ternary aluminate, the following are the compositions having the best electron emission properties: 4 moles of BaO+1 mole of CaO+1 mole of $Al_2O_3$ and 5 moles of BaO+2 moles of $Al_2O_3$ The compounds with a lower degree of barium evaporation such as 5-4-2 (5 moles of BaO, 4 moles of CaO and 2 moles of $Al_2O_3$) and with good electron emissivity are also worth noting. For quaternary aluminate, a scandium content ranging between 2% and 7% by weight of the total quantity of the compound forming the reserve gives good results.

The sol-gel can be prepared, in the case of a barium aluminate and a calcium aluminate 4-1-1, using the following organic precursors: aluminium butoxide, barium propionate, calcium propionate. These organometallic products are dissolved separately as follows: aluminium butoxide with propanol, barium propionate and calcium propionic in proprionic acid. Then they are mixed together in the corresponding proportions after the formation of the aluminates with 4 BaO, 1 CaO and 1 $Al_2O_3$. The temperature of the stable solution obtained is maintained at 0° C. in order to limit the speed of hydrolysis and to obtain a homogenous gel. To this solution, there is added an equal volume of a weak base solution, $N_2H_4$-$H_2O$ (0.5 moles) in ethanol. The entire mixture is stirred vigorously for 15 minutes.

The cathode obtained according to the method of the invention can be coated with a film, having a thickness ranging between 10 and 30000 A, of at least one of the elements selected from the group comprising osmium, ruthenium, iridium and alloys containing at least one of these elements.

What is claimed is:

1. A method for the fabrication of an impregnated cathode, wherein a porous body is made by the pressing and sintering of at least one refractory metal powder, and wherein this porous body is impregnated with a compound capable of resulting in high electron emissivity, a method wherein the operation to impregnate the body comprises the following steps:

a solution is made, consisting of a stable mixture of organometallic compounds, suited to the formation of a powder which favors an electron emission and which can be used in the application of a sol-gel procedure, the sol-gel procedure is triggered and controlled by appropriate means, the porous body is introduced into a solution where it is kept for an appropriate period, the organic solvents are removed, the temperature of the body is raised until the in situ baking of the compound impregnating the body is obtained.

2. A method according to claim 1, wherein the solution used to impregnate the porous body is obtained by means of at least one organic precursor of barium, calcium, aluminium or scandium.

3. A method according to claim 1, wherein there is introduced, into the solution, barium, calcium, aluminium or scandium in the form of organic or mineral salts soluble in the same solvent as the organic precursor or precursors or in a solvent which is miscible with it.

4. A method according to either of the claims 2 or 3, wherein the hydrolysis of the solution is achieved by adding a weak base to it.

5. A method according to claim 4, wherein the solution is vigorously while keeping it at a temperature ranging between about −10° C. and +10° C.

6. An impregnated cathode obtained by the method according to claim 1, said cathode comprising a porous body made of a refractory metal impregnated with a compound suited to obtaining high electron emissivity, said cathode being characterized by the fact that the pores of the body are only partially filled with said compound.

7. An impregnated cathode according to claim 6, wherein the pores of the body are filled by the emissive compound to a value ranging between 10% and 50%.

8. An impregnated cathode according to claim 6 wherein the walls of the pores of the body are lined by the compound, with a free microchannel remaining between the lined walls.

9. An impregnated cathode according to claim 6 wherein the impregnated volume is microporous.

* * * * *